United States Patent
Stöhr et al.

(10) Patent No.: US 11,258,777 B2
(45) Date of Patent: Feb. 22, 2022

(54) METHOD FOR CARRYING OUT A TWO-FACTOR AUTHENTICATION

(71) Applicant: GIESECKE+DEVRIENT MOBILE SECURITY GMBH, Munich (DE)

(72) Inventors: Volker Stöhr, Munich (DE); Frank-Michael Kamm, Holzkirchen (DE); Nils Gerhardt, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 212 days.

(21) Appl. No.: 16/481,679

(22) PCT Filed: Jan. 29, 2018

(86) PCT No.: PCT/EP2018/000041
§ 371 (c)(1),
(2) Date: Jul. 29, 2019

(87) PCT Pub. No.: WO2018/137889
PCT Pub. Date: Aug. 2, 2018

(65) Prior Publication Data
US 2019/0364032 A1  Nov. 28, 2019

(30) Foreign Application Priority Data
Jan. 27, 2017  (DE) .................... 10 2017 000 768.3

(51) Int. Cl.
*H04L 29/06* (2006.01)
*H04L 9/32* (2006.01)

(52) U.S. Cl.
CPC ........ *H04L 63/0807* (2013.01); *H04L 9/3213* (2013.01); *H04L 9/3226* (2013.01); *H04L 9/3234* (2013.01); *H04L 9/3271* (2013.01); *H04L 63/0428* (2013.01);
(Continued)

(58) Field of Classification Search
CPC . H04L 63/0807; H04L 9/3213; H04L 9/3226; H04L 9/3234; H04L 9/3271; H04L 63/0428; H04L 63/0853; H04L 63/123; H04L 2463/082
See application file for complete search history.

(56) References Cited

U.S. PATENT DOCUMENTS

| 9,602,508 | B1* | 3/2017 | Mahaffey | ............ | H04W 12/084 |
| 10,469,481 | B2* | 11/2019 | Mahaffey | ............ | H04L 63/0869 |
| 2013/0054474 | A1 | 2/2013 | Yeager | | |

(Continued)

FOREIGN PATENT DOCUMENTS

| CN | 106789072 A * | 5/2017 |
| DE | 102011089580 B3 | 4/2013 |

(Continued)

OTHER PUBLICATIONS

Srinivas, S., Balfanz, D., Tiffany, E., & Alliance, F. I. D. O. (2014). Universal 2nd Factor (U2F) Overview. (Year: 2014).*

(Continued)

*Primary Examiner* — Michael R Vaughan
(74) *Attorney, Agent, or Firm* — Workman Nydegger

(57) ABSTRACT

The invention relates to a method for carrying out a two-factor authentication between a client and a relying party, wherein, as the second factor, a data carrier is employed which carries out a communication with a token server.

14 Claims, 3 Drawing Sheets

(52) U.S. Cl.
CPC ........ *H04L 63/0853* (2013.01); *H04L 63/123* (2013.01); *H04L 2463/082* (2013.01)

(56) References Cited

U.S. PATENT DOCUMENTS

| | | | |
|---|---|---|---|
| 2013/0080769 | A1 | 3/2013 | Cha et al. |
| 2014/0189360 | A1 | 7/2014 | Baghdasaryan et al. |
| 2014/0351589 | A1 | 11/2014 | Chenna |
| 2015/0180869 | A1 | 6/2015 | Verma |
| 2016/0087957 | A1 | 3/2016 | Shah et al. |
| 2018/0101850 | A1* | 4/2018 | Pisut, IV ............... G06Q 20/10 |
| 2018/0191695 | A1* | 7/2018 | Lindemann ......... H04L 63/0853 |
| 2019/0036924 | A1* | 1/2019 | Wang .................... H04W 76/10 |
| 2021/0110027 | A1* | 4/2021 | Stohr ...................... G06F 21/45 |

FOREIGN PATENT DOCUMENTS

| | | |
|---|---|---|
| WO | 2007114710 A2 | 10/2007 |
| WO | 2016044373 A1 | 3/2016 |
| WO | 2016105553 A1 | 6/2016 |

OTHER PUBLICATIONS

Charles, A., Dahiya, J., Jang, J., & Kaur, B. (2016). Implementation of Two-Factor Authentication with U2F for Gravitational Teleport . (Year: 2016).*
Alliance, S. C. (2016). Smart Card Technology and the FIDO Protocols. (Year: 2016).*
"Personalausweis (Deutschland)," retrieved from https://de.wikipedia.org/wiki/Personalausweis(Deutschland) on Oct. 28, 2019, 31 Pages.
"U2F," retrieved from https://de.wikipedia.org/wiki/U2F on Oct. 28, 2019, 9 Pages.
German Search Report from DE Application No. 102017000768.3, dated Apr. 10, 2017.
International Search Report from PCT Application No. PCT/EP2018/000040, dated May 11, 2018.
International Search Report from PCT Application No. PCT/EP2018/000041, dated May 11, 2018.

* cited by examiner

METHOD FOR CARRYING OUT A TWO-FACTOR AUTHENTICATION

TECHNICAL FIELD

The present invention relates to a method for carrying out a two-factor authentication between a client and a relying party.

A client is, for example, a mobile telephone, a tablet PC, a computer (PC) or the like. By way of example, a relying party can be a facility such as a host, a server, or the like that makes possible access to a service, in particular a secure software application.

For the two-factor authentication, the industry standard U2F (Universal Second Factor) is preferably used. The U2F specification is managed by the FIDO Alliance (Fast IDentity Online).

STATE OF THE ART

The two-factor authentication is usually initiated by a service provider (relying party) asking, as the first factor, for the user name and possibly for the associated password for authentication, wherein the user name identifies the user and the password authenticates the user. The service provider checks these data and, if the data are in order, commences the verification of the second factor (possession) in the form of U2F.

In a first step, the service provider (relying party) sends a data packet to a customer computer, such as, for example, a web browser. This packet includes a challenge, which is some randomly chosen data, an application identifier (AppID), and a key identifier (KeyHandle), which was deposited upon the initial login.

The customer computer checks the application identifier, supplements this by additional data, such as, for example, a channel identifier (channel ID), and forwards these data in hashed form to the U2F device. For example, the U2F device can be a USB dongle with a button.

The U2F device ascertains, with the aid of the key identifier (KeyHandle), the private key (kpriv) matching for this session, and with said key signs the hashed values of the application identifier and of the challenge, thus forming the signed return response.

In addition, a counter is integrated into the response to be able to recognize duplicated U2F devices. The customer computer, such as, for example, the web browser, forwards these data to the service provider, who checks the signature s and the data contained therein with the PublicKey, and, if these data are in order, grants the access.

An intricacy of FIDO-U2F is that it is laid out to be used on a PC or the like, where also a USB dongle can be inserted as a second factor in a USB interface. Although it is possible to present the second factor via NFC or Bluetooth, in this case special authenticators are required, which usually have to be acquired specifically and exclusively for employment for FIDO.

However, there is a desire to be able to effect a two-factor authentication compliant with FIDO-U2F also on further electronic facilities such as, for example, a mobile telephone. In this respect, there is a further desire to be able to use as the second factor a data carrier with a contactless interface, such as, for example, a credit card, already held by the user in connection with a mobile telephone to carry out a two-factor authentication according to FIDO-U2F.

FIDO-U2F requires the employment of elliptic curves for signing. Credit cards or payment cards generally do not have this function. Alternatively, the utilization of RSA for signing according to FIDO-UAF is permitted. In addition to the RSA signing, FIDO also requires the generation of RSA key pairs. This generation of RSA keys would absorb too much computing time on the card, so that the execution time would be unacceptable to the user, and is not implemented on current credit cards.

Alternatively, the new national identity card of the FRG (nPA) could be used as the second factor and be coupled to the mobile telephone by radio connection. However, the eID functionality is currently enabled only in 30-35% of the identity cards in the field. Furthermore, upon each utilization, the eID functionality requires the additional input of a six-digit password, which must be input while holding the nPA to the NFC interface of the mobile telephone.

STATEMENT OF THE INVENTION

It is the object of the invention to make available a method for carrying out a two-factor authentication between a client and a relying party which solves the known problems from the state of the art and which makes it possible to employ a device that is already held by the user for the U2F authentication. The method is to be set up such that also such facilities which were not devised especially for FIDO applications can be utilized at the second factor without the approval of the issuer of the second factor being necessary and/or without the relying party being able to recognize a difference to the standardized FIDO method.

This object is achieved by a method according to the independent claim 1. Preferred embodiments of the method can be found in the subclaims.

The invention is based on the idea of using a data carrier, in particular an EMV card, as a second form factor (U2F), wherein the data carrier is connected to a token server via a client, for example a mobile telephone. The token server can then take over other services, such as, for example, a resource-intensive key derivation, without the requirement to procure a user database.

Accordingly, the invention relates to a method for carrying out a two-factor authentication between a client and a relying party, comprising the following steps of: carrying out an authentication between the client and the relying party, transmitting additional authentication data from the relying party to the client; requesting a server challenge (EMV Challenge) by the client from a token server; transmitting the server challenge from the token server to the client; carrying out a data exchange between the client and a data carrier, wherein the client receives data-carrier authentication data from the data carrier, wherein the data-carrier authentication data are computed, at least in part, while employing data from the server challenge, transmitting authentication data from the client to the token server, wherein the authentication data comprise data from the data exchange between the client and the data carrier, in particular the data-carrier authentication data, as well as the additional authentication data; verifying the authentication data by the token server; generating an authentication response in the token server; transmitting the authentication response from the token server to the client; and transmitting the authentication response from the client to the relying party and verifying the authentication response by the relying party.

With the method according to the invention, it is particularly advantageously possible to carry out a two-factor authentication while employing the data carrier of the user, wherein the data carrier does not have to be specially adjusted for employment in the two-factor authentication method. Further, it is not necessary to carry out a PIN verification vis-à-vis the data carrier, in particular the EMV data carrier. Further, in the method advantageously a simple token server can be used, which manages without a user database in which data are stored for each user. Consequently, costs can be saved both in the selection of the data carrier and in the selection of the token server. In particular, the aspect of easy selection of the data carrier to be used in the method lowers the entry barrier for the user, since he can simply use one of his already existing data carriers in the method. Contrary to the usual name, the relying party can also be used as a confirmation instance vis-à-vis a service facility, such as, for example, a web shop, an e-mail service, etc. The relying party then acts as an authentication service, also referred to as authentication-as-a-service (AaaS), wherein the authentication service takes over the (two-factor) authentication for the service facility.

According to the invention, the client is a facility such as a mobile telephone, a tablet PC, a PC or the like. The relying party is a facility such as a host, a server or the like that makes possible access to a service, in particular a secure software application. An example of a relying party is a web service to which a user wishes to gain access, in particular a web shop, a banking access, an e-mail application or the like. In the authentication between the client and the relying party, for example, a user name and a password are queried.

The data-carrier authentication data are, for example, certificates that the client receives from the data carrier, for example an issuer certificate (issuer) and/or a data-carrier-specific certificate, as well as data that are ascertained through a data exchange between the client and the data carrier while making use of data from the server challenge. It can thus be ensured that the data-carrier authentication data also take into account the contents of the server challenge. The data-carrier authentication data can comprise additional data.

The authentication data, which are transmitted from the client to the token server, advantageously comprise both data from the data exchange between the client and the data carrier, thus also the data-carrier authentication data, as well as additional authentication data from the authentication between the client and the relying party. This ensures that the data carrier has actually been present during the data exchange between the client and the data carrier upon receipt of the server challenge. A repeated introduction of the data-carrier authentication data into the authentication data is immediately noticeable, since the data-carrier authentication data are always computed in dependence on the server challenge, wherein the server challenge is changed upon each call. Thus, it is advantageously possible to prevent replay attacks, since the token server memorizes the randomly generated server challenge and employs this to verify the data carrier data.

According to one embodiment, upon carrying out the authentication between the client and the relying party, a KeyHandle, in particular a UserPrivateKey protected against unauthorized access, in particular an encrypted UserPrivateKey, a challenge, in particular a FIDO challenge, and/or an AppID, in particular a FIDO AppID, are transferred. Based on these data, it is advantageously possible to compute the authentication response. This ensures that the authentication response is computed individually for each two-factor authentication.

Further, the invention can comprise checking the AppID as well as the check with which facility a second factor is to be proven in the authentication. Thus, the client is informed advantageously that, for example, a data carrier can be used as the second factor (U2F). This simplifies the method for the user.

According to a particularly preferred embodiment, no PIN input vis-à-vis the data carrier is required for carrying out the method, in particular for carrying out the data exchange. Instead, the data carrier (U2F) can authenticate itself vis-à-vis the token server and the token server can authenticate itself vis-à-vis the relying party preferably by means of cryptographic methods. The PIN verification of the data carrier vis-à-vis the token server is not required, but can be optionally provided. When an identity document, in particular the German national identity card (nPA) is employed as the data carrier, then a PIN verification vis-à-vis the data carrier and also vis-à-vis the relying party is always necessary, thus a double PIN verification, which can possibly be considered troublesome. For EMV cards, the PIN verification is not mandatory.

According to a further particularly preferred embodiment of the invention, the server challenge has, inter alia, a random number. The random number can be formed, for example, as a 4-byte number. By sending the random number to the client, it is later possible to include the random number in the data-carrier authentication data, for example in the form of a signature. As a result, the token server can advantageously check whether the data carrier was actually "presented" to the client.

Further, according to a preferred embodiment, for carrying out the data exchange between the client and the data carrier, a contactless and/or a contact-type connection between the client and the data carrier can be established. Consequently, it is possible to connect the data carrier to the client via an air interface. For this purpose, an NFC connection between the data carrier and the client can preferably be established by holding the data carrier, for example, to an NFC interface of the client (mobile telephone/tablet PC).

Alternatively, the data carrier can be introduced into a card reader of the client (PC) in contact-type manner.

According to a further aspect of the invention, the verification of the authentication data by the token server can prove that the data carrier was physically present during the data exchange between the client and the data carrier. The authentication data are computed taking into account the data-carrier authentication data. The data from the server challenge are included in the data-carrier authentication data. Consequently, the verification of the authentication data can advantageously prove that the data carrier, i.e. the second factor (U2F), was physically present during the data exchange between the client and the data carrier. This fulfills a substantial requirement of two-factor authentication.

According to a further embodiment, upon the verification of the authentication data by the token server, the token server, upon successful verification, can decrypt a client key from the authentication data, wherein the client key is used in the generation of the authentication response. In the client key there are advantageously included a token server master key that is securely stored in the token server, as well as data originating exclusively from the data carrier, the relying party and the client. The client key is advantageously a so-called. ENC/MAC wrapping key and/or the KeyHandle in which the encrypted FIDO PrivKey is included. Thus, the token server can advantageously be supplied cost-efficiently, since no user data need to be stored in the token server. Only the token server master key must be kept secure in the token server, preferably in an HSM (hardware security module).

According to the invention, a client is provided which is suitable for employment in a method according to the above explanations, wherein the client is a mobile terminal, a tablet PC and/or a PC. According to these embodiments, it is particularly advantageously possible to execute a method according to the invention.

Further, the method according to the invention can be carried out particularly advantageously with a system which is adapted for employment in a method according to the above explanations.

According to a further embodiment, the authentication of the user is not effected directly between the token server and the relying party, but via an intermediary authentication service ("Identity Federation Service"). In this case, the relying party requests the user authentication from the authentication service via an industry-standard federation protocol (e.g. OpenID Connect or SAML). The authentication service will then request authentication from the user with the aid of the client, the token server and the data carrier. The authentication procedure takes place as described above, but takes place vis-à-vis the authentication service and not vis-à-vis the relying party. After successful authentication, the authentication service attests to the authentication vis-à-vis the relying party, possibly supplemented by further identity data or user-specific attestations that the authentication service can carry out due to its stored user data.

In summary, it is possible with the method according to the invention to employ almost any data carrier as the second factor; in particular, EMV cards can be employed as the second factor for FIDO-U2F.

The data carriers do not need to have the cryptographic capabilities required for FIDO. Therefore, many persons no longer need to acquire and procure a separate "2$^{nd}$ Device". Further, the approval of the issuers of the data carriers (card issuers) for the execution of the method is not necessary. Thus, the method can be implemented without substantial effort.

The required token server does not need a database to store user data/client data. As a result, the token server is simple and cost-efficient. Only an HSM for keeping the token server master key is advantageous.

The method according to the invention is secure against Trojans on the client through employing the server challenge in the computation of the data-carrier authentication data.

A further advantage of the method is that the data carrier only has to be held close to the client while the data exchange between the client and the data carrier is carried out. This minimizes the likelihood of unintentionally interrupted authentications.

DETAILED DESCRIPTION OF EMBODIMENTS OF THE INVENTION

Hereinafter, exemplary embodiments of the invention will be described in detail with reference to FIGS. 1-3. Changes with reference to the method described are possible within the scope of protection defined by the claims.

Figure 1:
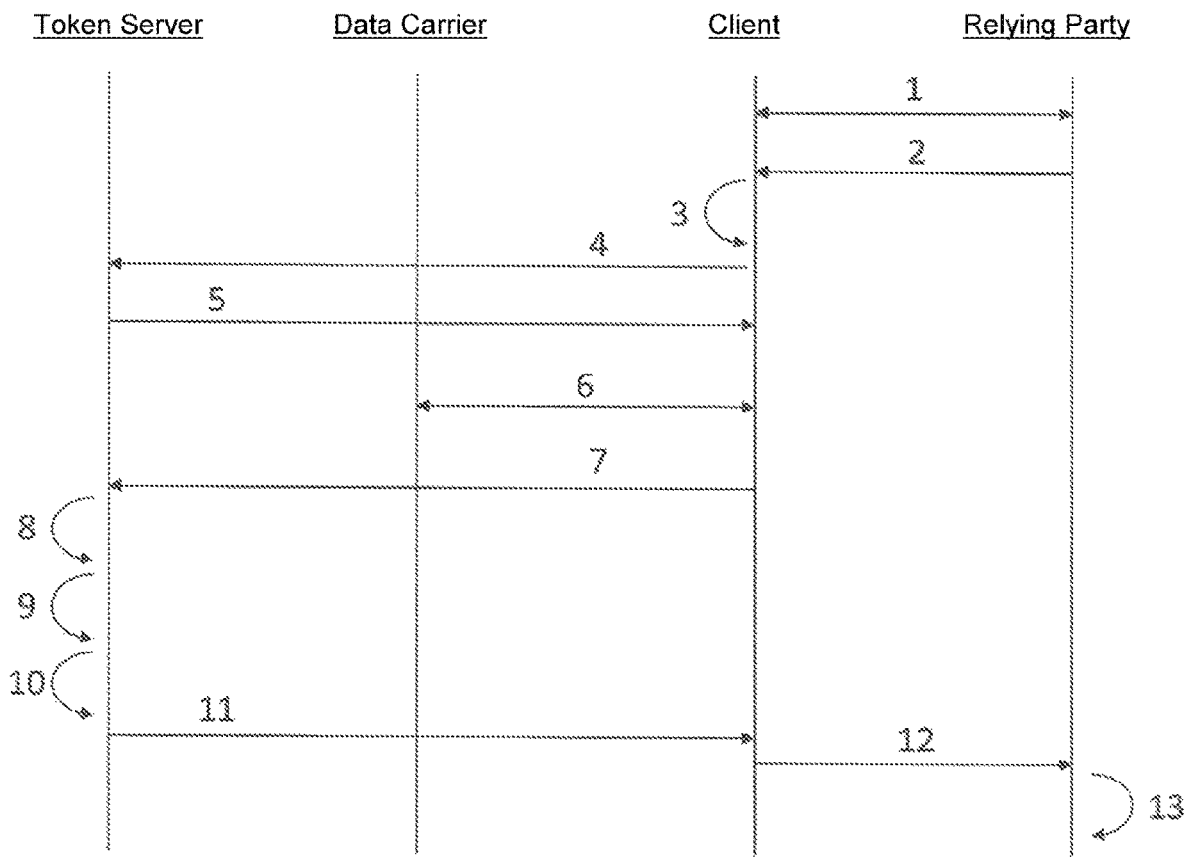
FIG. 1 shows schematically the sequence of a two-factor authentication according to the invention.

FIG. 1 schematically shows the sequence of a two-factor authentication according to the invention between a client and a relying party. A client is, for example, a mobile telephone, a tablet PC, a computer (PC) or the like. By way of example, a relying party can be a facility such as a host, a server, or the like that makes possible access to a service, particularly a secure software application.

For the two-factor authentication, the industry standard U2F (Universal Second Factor) is preferably used. The U2F specification is managed by the FIDO Alliance.

In the two-factor authentication according to the invention, first (step 1) an authentication is carried out between the client and the relying party. This can be carried out, for example, by inputting user name and password in a web browser.

In the next step 2, additional authentication data are transmitted from the relying party to the client. The additional authentication data can be, for example, a (FIDO) KeyHandle, a FIDO challenge and a (FIDO) AppID. These terms are sufficiently known from the FIDO standard, for which reason a description is omitted apart from the brief description of the terms below.

The KeyHandle identifies and has the private key (UserPrivateKey) in encrypted form for the subsequent authentication of the user vis-à-vis the relying party. The challenge is a normal challenge for a cryptographic operation, such as, for example, a random number. The AppID identifies the (web) service that the user wants to authenticate to.

In a subsequent, optional step 3, the AppID can be verified. Further, it can be checked in step 3, in which manner the second factor (U2F) can be proven. In the present case, it is assumed that a data carrier is permitted as the second factor.

In a subsequent step 4, the client requests a server challenge from a token server. This server challenge can also be referred to as EMV challenge, if the data carrier to be employed is an EMV card. The server challenge comprises a random number (unpredictable number) supplied by the token server. The random number is, for example, at least 4 bytes long. The server challenge is checked, in particular signed, by the data carrier in a later step 6 (see below). The signature enables the token server to verify whether or not the data carrier has actually been presented to the client. Since the server challenge contains the random number, the possibility of a replay attack by an attacker is made more difficult. In step 4, additional authentication data can be transmitted from the client to the token server within the scope of the server challenge request. Alternatively, these additional authentication data can be transmitted in step 7 (see below). It is irrelevant whether the additional authentication data are transmitted to the token server in step 4 and/or 7.

Subsequently, the server challenge is transmitted from the token server to the client in a further step 5.

Subsequently, a data exchange between the client and the data carrier is carried out (step 6). In the course of the data exchange, the data carrier is brought into connection with the client, for example in contactless or contact-type manner. Data are exchanged between the data carrier and the client. For example, the client can receive at least one certificate from the data carrier, in particular an IssuerPKCert and a CardPKCert.

Further, in step 6, the client sends the server challenge to the data carrier, wherein the data carrier computes data-carrier authentication data and the server challenge is included in the computation of the data-carrier authentication data. Since the server challenge is included in the computation of the data-carrier authentication data, the random number from the server challenge is also included in the computation. According to the invention, the client only accepts the data-carrier authentication data from the data carrier without checking them, since according to the invention the check is effected in the token server (steps 8-10) at a later time. At the later time of the check in the token server, it is no longer necessary to connect the data carrier to the client.

In a subsequent step 7, authentication data are transmitted from the client to the token server, wherein the authentication data comprise data from the data exchange between the client and the data carrier, in particular the data-carrier authentication data, as well as the additional authentication data. Data originating from the exchange with the data carrier can comprise, for example, the IssuerPKCert, the CardPKCert, and the data-carrier authentication data. Data originating from the exchange with the relying party can comprise the KeyHandle, a hash of the AppID, as well as a hash of the client data, wherein the client data have the original (FIDO) challenge.

The authentication data transmitted to the token server are verified by the token server in a next step 8. During the check, the token server can check the IssuerPKCert with the aid of a present "Payment Scheme Public Key", the CardPKCert with the aid of the "Issuer Public Key" that has now been checked and the data-carrier authentication data with the aid of the "Card Public Key" that has now been checked.

If all checks are successful, it is ensured that the data-carrier authentication data originate from or were signed by an authentic data carrier, for example an EMV card, i.e. the corresponding data carrier was actually presented. For example, when employing an EMV card, the token server can convince itself that the data Primary Account Number, PAN Sequence Number (optional) and Expiry Date, which uniquely identify an EMV card, originate from the employed EMV card. In this context, the token server executes steps that would be carried out by the terminal in a known EMV transaction.

In the case of a successful verification, the token server decrypts a client key from the authentication data in a next, optional step 9. For this purpose, the token server can, for example, decrypt the User Private Key (also referred to as client key) which is contained (together with possibly other data) in the present key handle (see above). The preferably required (symmetric) key "KWrap" for decrypting KeyHandle can be derived from the following data: master key (main key) of the token server, Personal Account Number (PAN), (optional) PAN Sequence Number, (optional) ExpiryDate, (optional) further data. For example, according to an alternative, the key "KWrap" can be the result of the encryption or decryption of a hash value over the card data (PAN, PAN Sequence Number, Expiry Date, etc.).

All user-related data employed for the key derivation originate from the client, the data carrier or the relying party. A user database does not need to be procured in the token server. This makes it possible to configure the token server in simple manner and, as a result, to configure the token server more cost-efficiently. Only the master key of the token server to be employed according to a preferred embodiment must be kept secure in order to guarantee the security of the method. An HSM (hardware security module) lends itself for this purpose.

Subsequently, in a next step 10, an authentication response is generated in the token server. The authentication response serves to confirm the authenticity of the second factor (U2F), in the present case of the data carrier. In the present embodiment example the (FIDO) authentication response message can be generated with the aid of the user private key, which is a signature with the aid of the user private key over a hash (AppID), a hash (client data), wherein with this hash also the original FIDO challenge of the relying party is indirectly signed, a counter (Application Transaction Counter of the EMV card), etc.

Thereafter, the authentication response is sent possibly in connection with other data to the client in a subsequent step 11 and sent from there to the relying party in a further step 12. Alternatively, the authentication response can also be sent directly to the relying party.

The relying party then checks (step 13) the authentication response; in the aforementioned embodiment example the relying party checks the (signature of the) (FIDO) authentication response. The relying party employs the user public key (client key) for this purpose. This verification can be effected according to the FIDO standard and will therefore not be explained further.

Figure 2:
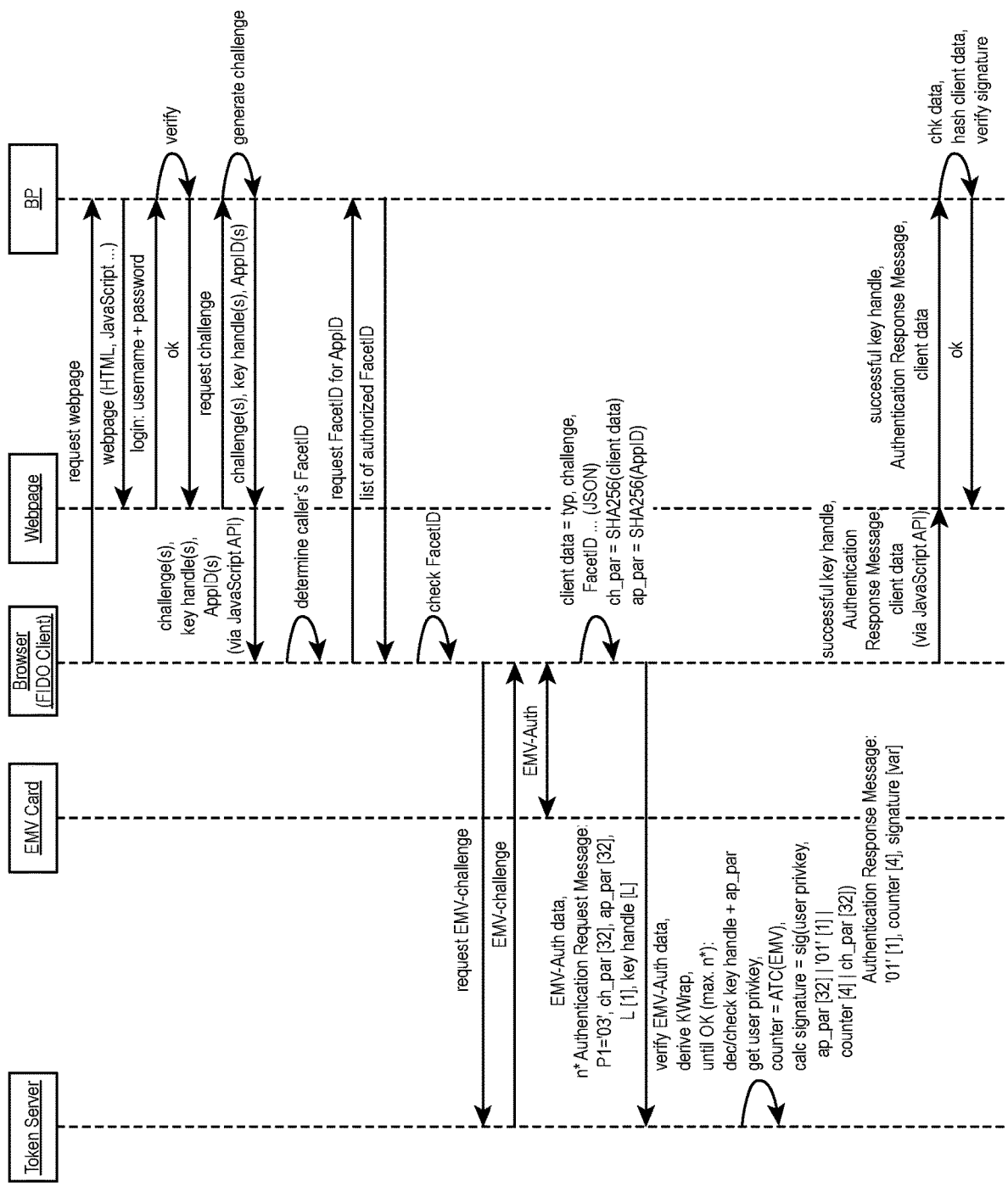
FIG. 2 shows the sequence of a two-factor authentication according to the invention in a more detailed representation.

FIG. 2 shows the sequence of an authentication according to the invention when employing an EMV card as the data carrier. An EMV card is usually a payment card that is formed according to the EMV specification (Europay International, MasterCard and VISA). EMV cards are currently specified so as to be incapable of computing elliptic curves which are applied in asymmetric crypto systems and which are required in a FIDO-U2F authentication.

Accordingly, the method according to the invention is suitable, inter alia, when employing an EMV card (data carrier) as the second factor (U2F), since the EMV card can outsource the computation required according to FIDO in cooperation with a token server.

FIG. 2 shows in this context the exemplary sequence of a two-factor authentication according to the invention, in which a user attempts to log into a web page of a relying party in a browser (FIDO client). The steps shown in FIG. 2 substantially correspond to the steps already explained in FIG. 1, for which reason a repeated detailed description is omitted.

Figure 3:
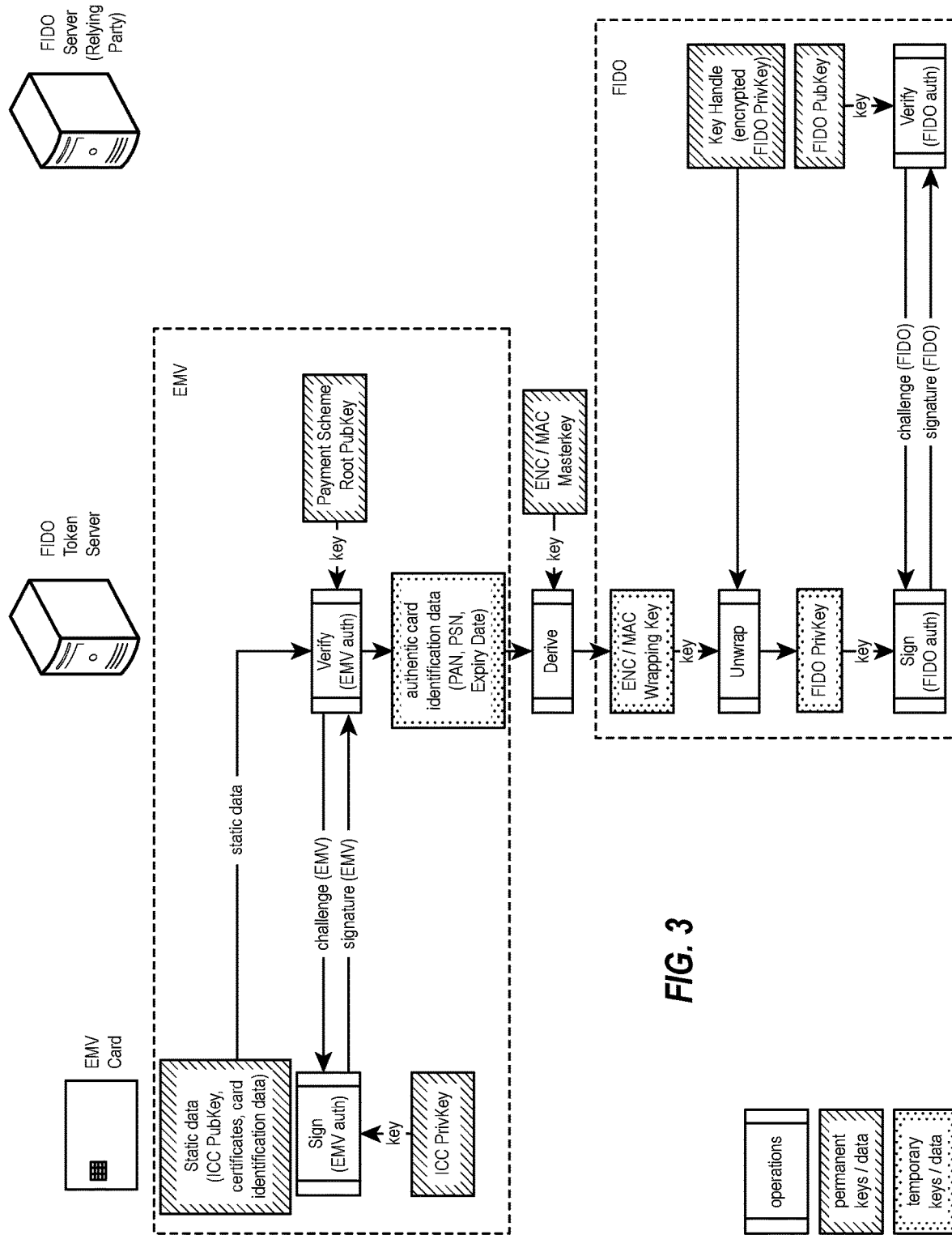
FIG. 3 shows a flowchart representing a two-factor authentication according to the invention.

FIG. 3 shows a flowchart which represents the two-factor authentication according to the invention, wherein, analogously to FIG. 2, likewise an EMV card is used as the data carrier. The sequences in FIG. 3 substantially correspond to the sequences shown in FIGS. 1 and 2, for which reason a repeated description is omitted.

A further embodiment example is that a mobile telephone, for example a smart phone, has a functionality that an EMV card also has, as described above. This function can be executed, for example, in a secure element (SE), for example the SIM card, in a trusted execution environment (TEE), i.e. a secure runtime environment for an application, or in a host card emulation (HCE), i.e. a technology for the virtualization of chip cards in NFC-based mobile payment methods, of the mobile telephone. Thus, the mobile telephone has a virtual card function.

The person skilled in the art recognizes from the description above that a broad variety of changes of the method according to the invention is possible within the scope of protection of the claims.

The invention claimed is:

1. A method for carrying out a two-factor authentication between a client and a relying party, comprising the following steps of:
    carrying out an authentication between the client and the relying party;

transmitting of first authentication data from the relying party to the client;
requesting a server challenge by the client from a token server;
transmitting the server challenge from the token server to the client;
carrying out a data exchange between the client and a data carrier, the data carrier being separate from the client, the token server, and the relying party,
wherein the client receives data-carrier authentication data from the data carrier,
wherein the data-carrier authentication data are computed at least in part while employing data from the server challenge,
transmitting second authentication data from the client to the token server,
wherein the second authentication data comprises data from the data exchange between the client and the data carrier and comprises the first authentication data;
verifying the second authentication data by the token server;
generating an authentication response in the token server;
transmitting the authentication response from the token server to the client; and
transmitting the authentication response from the client to the relying party and verifying the authentication response by the relying party.

2. The method according to claim 1, wherein upon carrying out the authentication between the client and the relying party a KeyHandle, a challenge, and/or an AppID are transferred.

3. The method according to claim 1, wherein for carrying out the method no PIN input for the data-carrier is required.

4. The method according to claim 1, wherein the server challenge has a random number.

5. The method according to claim 1, wherein a contactless and/or a contact-type connection between the client and the data carrier is established for carrying out the data exchange between the client and the data carrier.

6. The method according to claim 1, wherein the verification of the authentication data by the token server proves that the data carrier was physically present during the data exchange between the client and the data carrier.

7. The method according to claim 1, wherein upon the verification of the authentication data by the token server, the token server decrypts a client key from the authentication data, in particular from the additional authentication data,
wherein the client key is employed in the generation of the authentication response.

8. The method according to claim 1, wherein user information data is not stored in the token server.

9. The method according to claim 1, wherein the token server generates the authentication response with the aid of user data originating exclusively from the client, the data carrier and/or the relying party.

10. The method according to claim 1, wherein no PIN verification is necessary for the data exchange between the client and the data carrier.

11. The method according to claim 1, further comprising the step of verifying whether a two-factor authentication is permitted with the data carrier as the second factor.

12. A method according to claim 1, wherein the client is a mobile terminal, a tablet PC and/or a PC.

13. A client computing system comprising:
a processor;
one or more computer readable storage devices having stored thereon computer executable code that when executed by the processor cause the computing system to perform the following:
carry out an authentication with a relying party;
receive first authentication data from the relying party;
request a server challenge from a token server;
receive the server challenge from the token server;
carry out a data exchange with a data carrier, the data carrier being separate from the client, the token server, and the relying party, wherein the client receives data-carrier authentication data from the data carrier, wherein the data-carrier authentication data are computed at least in part while employing data from the server challenge,
transmitting second authentication data to the token server, wherein the second authentication data comprises data from the data exchange between the client and the data-carrier and comprises the first authentication data;
receiving an authentication response from the token server; and
transmitting the authentication response to the relying party for verification by the relying party.

14. A token server computing system comprising:
a processor;
one or more computer readable storage devices having stored thereon computer executable code that when executed by the processor cause the computing system to perform the following:
receiving a request for a server challenge from a client;
transmitting the server challenge to the client;
receiving authentication data from the client, wherein the authentication data comprises:
  (i) data from a data exchange between the client and a data carrier, wherein during the data exchange between the client and the data carrier, the client receives data-carrier authentication data from the data carrier, the data-carrier authentication data being computed at least in part while employing data from the server challenge, the data carrier being separate from the client, the token server and a relying party, and
  (ii) first authentication data from the relying party to the client;
verifying the authentication data;
generating an authentication response;
transmitting the authentication response to the client, the authentication response being provided to the relying party for verification by the client.

* * * * *